US005458931A

United States Patent [19]

Mankes

[11] Patent Number: 5,458,931

[45] Date of Patent: Oct. 17, 1995

[54] DECORATIVE MEDALLIONS PROVIDING ENHANCED DISPLAY OF GRAPHIC MATTER

[75] Inventor: Barney S. Mankes, New York, N.Y.

[73] Assignee: Leeman Designs Inc., Woodbury, N.Y.

[21] Appl. No.: 378,100

[22] Filed: Jan. 26, 1995

Related U.S. Application Data

[63] Continuation of Ser. No. 117,890, Sep. 7, 1993, abandoned.

[51] Int. Cl.$^{6}$ .......... B32B 3/02

[52] U.S. Cl. .......... 428/14; 428/28; 428/913.3; 70/456 R; 40/330

[58] Field of Search .......... 428/13, 14, 28, 428/913.3; 40/330; 70/456 R

[56] References Cited

U.S. PATENT DOCUMENTS

| | | | |
|---|---|---|---|
| 315,703 | 4/1885 | Bencke et al. | 428/14 |
| 634,851 | 10/1899 | Lindemann | 428/13 |
| 1,908,772 | 5/1933 | Lowenthal | 428/14 |
| 4,259,388 | 3/1981 | Reed | 428/174 |
| 4,500,571 | 2/1985 | Jones | 428/13 |

*Primary Examiner*—Alexander S. Thomas
*Attorney, Agent, or Firm*—Frederick H. Rabin

[57] ABSTRACT

A medallion article comprising a base member having a planar inner surface and a substantially planar lens mounted on the base member, said lens having an indicia-bearing inner surface spaced from the inner surface of the base member, whereby the indicia on the inner surface of the lens appear as shadows on the inner surface of the base.

4 Claims, 1 Drawing Sheet

DECORATIVE MEDALLIONS PROVIDING ENHANCED DISPLAY OF GRAPHIC MATTER

This application is a continuation, of application Ser. No. 08/117,890, filed 7 Sep. 1993, now abandoned.

FIELD OF THE INVENTION

This invention relates to decorative articles for displaying business trade names, slogans, trademarks and the like on promotional and novelty items such as key holders, paperweights or other desk accessories and other items typically given as gifts intended to promote business goodwill. More particularly, it relates a medallions and medallion-like articles in which a trade logo, or other company identifier is provided with an enhanced "in depth" display.

BACKGROUND OF THE INVENTION

Medallions are attached to a variety of products to provide identification of the product or its manufacturer or to provide available information about the use of the product. Indicia on medallions of this type may include emblems, trade names, artistic designs, slogans or trademarks. This invention is concerned primarily with medallions which provide visually attractive identification of a company or product and which are intended mainly to serve as promotional items to enhance the goodwill of the business which is being identified. Medallions of the type covered by this invention can also be articles for retail sale.

Most medallions of this type consist of a rigid substrate or base member on which some graphic material, such as a decorative design or trademark, are imprinted and over which a transparent cap is mounted. Imprinting graphic matter directly on metal in a manner which will result in a medallion of having a high quality "image" is relatively expensive. As an alternative, the indicia can be imprinted on foil which is then adhered to the metal surface. Furthermore, with a metallic base portion, it has not generally been possible to provide, at reasonably low cost, a medallion with an "in depth" three-dimensional appearance without resorting to a convex bubble-type cap. The use of this type of cap causes distortion of the graphic material when viewed from a side angle, thereby detracting from the high quality "image" sought by its sponsor.

As an alternative, plastic base members have been used with graphic material sandwiched between two layers of hardened thermoplastic resin—see U.S. Pat. No. 4,330,578—but such medallions do not always provide the desired high quality image, particularly when the medallion is used on an article such as a key chain where the medallion is handled directly by the user. Furthermore, many companies or other sponsors prefer metallic articles.

U.S. Pat. No. 4,259,388 discusses some of the limiting features of prior art medallions and provides an improved method for applying the desired indicia onto the surface of a metallic substrate. The products have a generally convex transparent cap and do not usually project the desired image of high quality.

U.S. Pat. No. 4,556,588 relates to decorative emblems having a foil inlay padding with graphic indicia on its upper surface, and a flexible plastic lens cap overlying the inlay. The inlay is bonded to a flexible base member.

Although the medallions disclosed in the prior art may be suitable for their designated purposes, they do not generally provide a high quality corporate image. In order to project such high quality image, it is necessary for the medallion itself to have an appearance of high quality. Thus, in an article such as a key holder which is regularly handled by its user, the company sponsoring such an article as a business gift requires that the article itself have an appearance of quality, thereby enhancing the image of the sponsor. With key holders, there is a practical consideration arising from the fact that keys will strike the medallion and, unless the medallion is made of a high quality substance, there will develop unsightly dents or scratches. It is the primary object of this invention to provide such medallions and articles in which such medallions are the principal decorative and/or identifying features.

SUMMARY OF THE INVENTION

This invention provides a rigid medallion comprising a base portion, preferably of metal, having a planar inner surface, and, mounted on said base, a substantially planar lens imprinted on its inner surface with graphic material, such as a trademark, slogan, trade name, corporate logo or similar indicia. The lens is generally of the type used as crystals in watches and the inner surface thereon is spaced apart from the inner surface of the base member. This spacing causes the indicia on the inner surface of the lens to appear as shadows on the inner surface of the base, thereby providing the viewer with an in-depth, three-dimensional effect.

These medallions are suitable for attachment to key holders, but can also be recessed into a substrate and incorporated into other articles such as paper weights, other desk accessories, buttons, pendants, money clips, etc.

DETAILED DESCRIPTION

Figure 1:
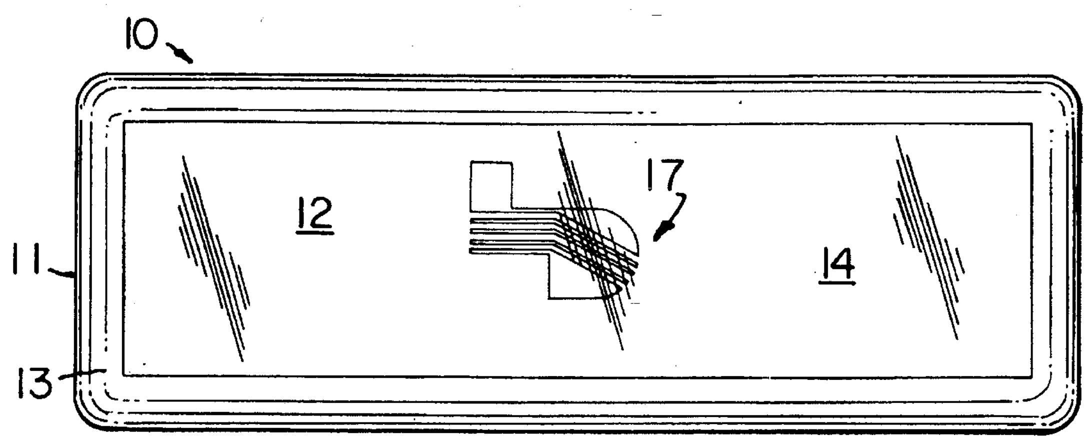
FIG. 1 is a top view of a medallion in accordance with this invention.
Figure 2:
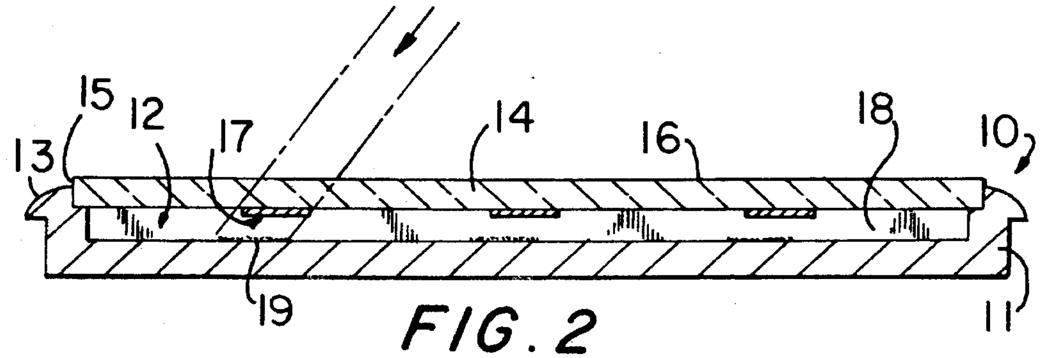
FIG. 2 is a cross sectional view showing particularly the mode of imprinting the indicia according to this invention.

A typical medallion embodying the present invention is shown in FIGS. 1 and 2 and is generally designated by 10. The article comprises a metallic base member 11 having a planar inner surface 12 and a rim area 13. Inner surface 12 preferably has a matted finish which provides a surface in which a soft shadow of the indicia is visible. Mounted on base 11 is a lens 14 similar to a watch lens, which is generally planar in nature and has an edge 15 to facilitate its mounting on base member 11. Preferably the lens 14 is mounted so that its outer surface 16 projects slightly above the plane defined by the uppermost part of rim area 13, as shown in FIG. 2, but it is also possible for outer surface 16 to be coplanar with rim area 13. The lens 14 is sealed into base member 11 and held in place by rim area 13.

Graphic material such as, for example, a corporate logo 17 is applied to the inner surface of lens 14 by, for example, silk screening or pad printing etc. Lens 14 is mounted so that there is a space 18 between the inner surface of said lens and the inner surface 12 of the base member. The inner surface of lens 14 and the inner surface 12 of base member 11 are parallel making the surfaces equidistant from each other.

The distance between the surfaces can be, for example, between about 1 and about 3 mm, preferably about 2 mm. The existence of this space results in a shadow 19 appearing on the inner surface 12 when light impinges onto the lens 14. The result is an apparent three-dimensional in-depth modification of the indicia 17 which were imprinted on the underside of lens 14.

Figure 3:
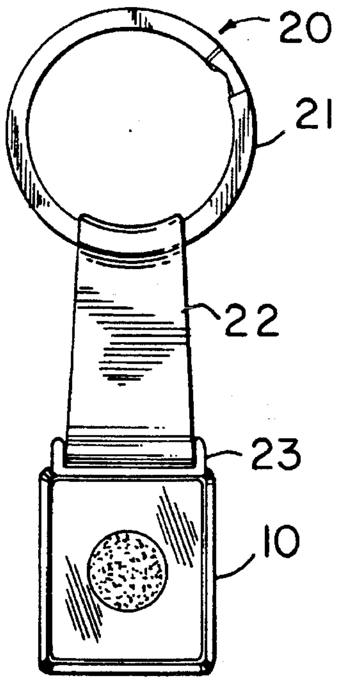
FIG. 3 is a perspective view of a key holder incorporating a medallion article of the invention.

FIG. 3 is a view of a key holder and is illustrative of one of the ways of using the medallion of this invention. The key holder, which is generally indicated by the FIG. 20, comprises a medallion 10, a key ring 21 and means to connect the key ring to the medallion. Illustrative of such connecting means is strap 22 which can be of leather or leather substitute and is connected to a projection 23 of the medallion by means of a pin mechanism (not shown) similar to that usually found in wrist watches. Other means are possible for connecting the key ring to the medallion such as, for example, a flexible chain.

It is also possible to incorporate the medallion of this invention into other articles such as paper weights, letter openers, other desk accessories, buttons, etc. In such articles, it is generally preferable that the medallion have a flat "top" i.e. that the outer surface 16 of the lens be co-planar with the upper most part of rim 13.

It is to be understood that, while the detailed drawings and specific example here provided describe preferred embodiments of the invention, they are for the purposes of illustration only. The articles of this invention are not limited to the precise details and conditions disclosed. For example, the outer contours of base member 11 may be somewhat differently shaped for ease of handling or to conform to a substrate in which the medallion article is embedded. Various changes may be made therein without departing from the spirit of the invention which is defined by the following claims.

I claim:

1. A rigid medallion article comprising:

a base member having a planar matted surface, a substantially planar lens permanently sealed onto the base member, said lens having an inner surface spaced from the inner surface of the base member, and graphic material consisting solely of indicia borne on the inner surface of said lens, whereby the indicia appear as shadows on the inner surface of the base.

2. A medallion article according to claim 1 in which the inner surfaces of the lens and the base member are equidistantly spaced.

3. A key holder comprising: a key ring; a rigid medallion article comprising a base member having a planar matted surface, a substantially planar lens sealed onto the base member, said lens having an inner surface spaced from the inner surface of the base member, and graphic material consisting solely of indicia borne on the inner surface of said lens;

and means to connect said key ring to said medallion article.

4. A key holder according to claim 3 in which the inner surfaces of the lens and the base member are equidistant.

* * * * *